(12) United States Patent
Kumagai et al.

(10) Patent No.: US 10,337,863 B2
(45) Date of Patent: Jul. 2, 2019

(54) SURVEY SYSTEM

(71) Applicant: TOPCON CORPORATION, Itabashi-Ku, Tokyo (JP)

(72) Inventors: Kaoru Kumagai, Tokyo (JP); Nobuyuki Nishita, Tokyo (JP); Takeshi Sasaki, Tokyo (JP)

(73) Assignee: TOPCON CORPORATION, Itabashi-ku, Tokyo (JP)

( * ) Notice: Subject to any disclaimer, the term of this patent is extended or adjusted under 35 U.S.C. 154(b) by 0 days.

(21) Appl. No.: 15/913,002

(22) Filed: Mar. 6, 2018

(65) Prior Publication Data
US 2018/0259330 A1  Sep. 13, 2018

(30) Foreign Application Priority Data

Mar. 8, 2017 (JP) ................. 2017-044429

(51) Int. Cl.

| | |
|---|---|
| *G01C 11/04* | (2006.01) |
| *G06T 7/70* | (2017.01) |
| *G01C 15/00* | (2006.01) |
| *G01C 11/02* | (2006.01) |
| *G06T 7/246* | (2017.01) |
| *G06T 7/285* | (2017.01) |
| *B64D 47/08* | (2006.01) |
| *B64C 39/02* | (2006.01) |

(52) U.S. Cl.
CPC .............. *G01C 11/04* (2013.01); *G01C 11/02* (2013.01); *G01C 15/002* (2013.01); *G06T 7/246* (2017.01); *G06T 7/285* (2017.01); *G06T 7/70* (2017.01); *B64C 39/024* (2013.01); *B64C 2201/127* (2013.01); *B64D 47/08* (2013.01); *G06T 2207/10021* (2013.01); *G06T 2207/10032* (2013.01); *G06T 2207/30181* (2013.01); *G06T 2207/30241* (2013.01); *G06T 2207/30244* (2013.01)

(58) Field of Classification Search
CPC .......... G01C 11/04; G06T 7/285; G06T 7/246
See application file for complete search history.

(56) References Cited

U.S. PATENT DOCUMENTS

| | | |
|---|---|---|
| 9,013,576 B2 | 4/2015 | Ohtomo et al. |
| 9,073,637 B2 | 7/2015 | Ohtomo et al. |
| 2012/0300070 A1 | 11/2012 | Ohtomo et al. |

FOREIGN PATENT DOCUMENTS

JP       2013-108927 A       6/2013

*Primary Examiner* — Nam D Pham
(74) *Attorney, Agent, or Firm* — Chiesa Shahinian & Giantomasi PC

(57) ABSTRACT

A survey system includes a camera provided on a UAV and taking a plurality of images for photogrammetry. A surveying portion tracking the camera and continuously determining a position of the camera and a relative photographing position calculation portion calculates a relative photographing position of each image based on the plurality of images taken by the camera, and a traveling path calculation portion calculates a traveling path of the UAV from a survey result obtained by the surveying portion. A photogrammetry analysis portion associating a point group of the relative photographing positions calculated by the relative photographing position calculation portion with a flight path calculated by the flight path calculation portion, and generating data for photogrammetry.

3 Claims, 6 Drawing Sheets

SURVEY SYSTEM

CROSS-REFERENCE TO RELATED APPLICATION

This application claims priority to Japanese Patent Application No. 2017-044429 filed on Mar. 8, 2017, the entire disclosure of which is incorporated by reference herein.

BACKGROUND

The present disclosure relates to a photogrammetry system that includes a movable photographing device taking images for photogrammetry and a surveying device determining a position of the movable photographing device.

In typically known stereophotogrammetry, a movable body includes a camera, which takes images (static images and dynamic images) from two or more different positions, the images being used for a survey.

In particular, in recent photogrammetry, an unmanned aerial vehicle (UAV) is used as a movable body including a camera, which takes images from the sky.

In such photogrammetry, a spatial position of each image taken is adjusted to generate a stereo model of target areas. For example, in Japanese Unexamined Patent Publication No. 2013-108927, a flying body flies in the sky above target survey areas in a meandering manner to take images. This photographing operation is periodically conducted so that each image overlaps an image adjacent thereto in the travelling direction by a predetermined amount, and overlaps an image adjacent thereto in an adjacent course by a predetermined amount. After all the photographing operations are completed, one pair of two adjacent ones of three images consecutive in the travelling direction is fixed so that one stereo image is produced. The other pair of two adjacent ones of the three images is also fixed so that the other image is produced. Feature points extracted from a portion shared by the three images in the image shared by the two stereo images are used to connect the two stereo images. Moreover, a tie point shared by the images adjacent to each other in the adjacent course is selected to connect the stereo images adjacent to each other in the course. Consequently, all the target survey areas are covered. In this manner, a unified stereo image (a stereo model) represented by the shared three-dimensional coordinate system is produced.

SUMMARY

However, the stereo model generated by combination of the images taken as in Japanese Unexamined Patent Publication No. 2013-108927 can be used for analysis of relative positions, but cannot be used for definition of absolute scales (distances), positions, and rotation. Then, the ultimately absolute coordinates cannot be determined.

In Japanese Unexamined Patent Publication No. 2013-108927, the absolute coordinates of the flying body during a photographing operation are determined by a global positioning system (GPS). Then, the photographing position determined by the GPS is less accurate than the position, determined by the total station, of the flying body.

When the position of the UAV is determined by the total station, the total station is away from the camera of the UAV during a photographing operation. Thus, it is necessary to associate the photographing positions of the camera with the survey result.

In addition, the control points (of which the coordinates are known) may be framed in all the images to associate the image with the ground point to determine absolute coordinates. However, in this case, it is necessary to frame at least four control points. Thus, the photographing operation is limited. In addition, it is necessary to determine the absolute coordinates of each control point in a target survey area in advance to set the control points. It is also necessary to set an air mark indicating the control point to clearly frame the control point in the image. As such, some effort is required.

In view of the foregoing, it is an object of the present disclosure to provide a survey system capable of easily associating relative photographing positions taken by a camera of a movable body with a survey result obtained by a surveying device tracking and surveying a movable photographing device to conduct accurate photogrammetry analysis.

To achieve the object, the survey system of an embodiment of the present disclosure includes a photographing portion provided in a movable body and taking a plurality of images for photogrammetry; a surveying portion tracking the photographing portion and continuously determining a position of the photographing portion; a relative photographing position calculation portion calculating a relative photographing position of each image based on the plurality of images taken by the photographing portion; a traveling path calculation portion calculating a traveling path of the movable body from a survey result obtained by the surveying portion; and a photogrammetry analysis portion associating a point group of the relative photographing positions calculated by the relative photographing position calculation portion with the traveling path calculated by the traveling path calculation portion and generating data for photogrammetry.

An embodiment of the present disclosure containing the above configuration can provide easily associating relative photographing positions taken by a camera of a movable body with a survey result obtained by a surveying device tracking and surveying a movable photographing device to conduct the accurate photogrammetry analysis.

DETAILED DESCRIPTION

Embodiments of the present disclosure will be described below with reference to the drawings.

Figure 1:
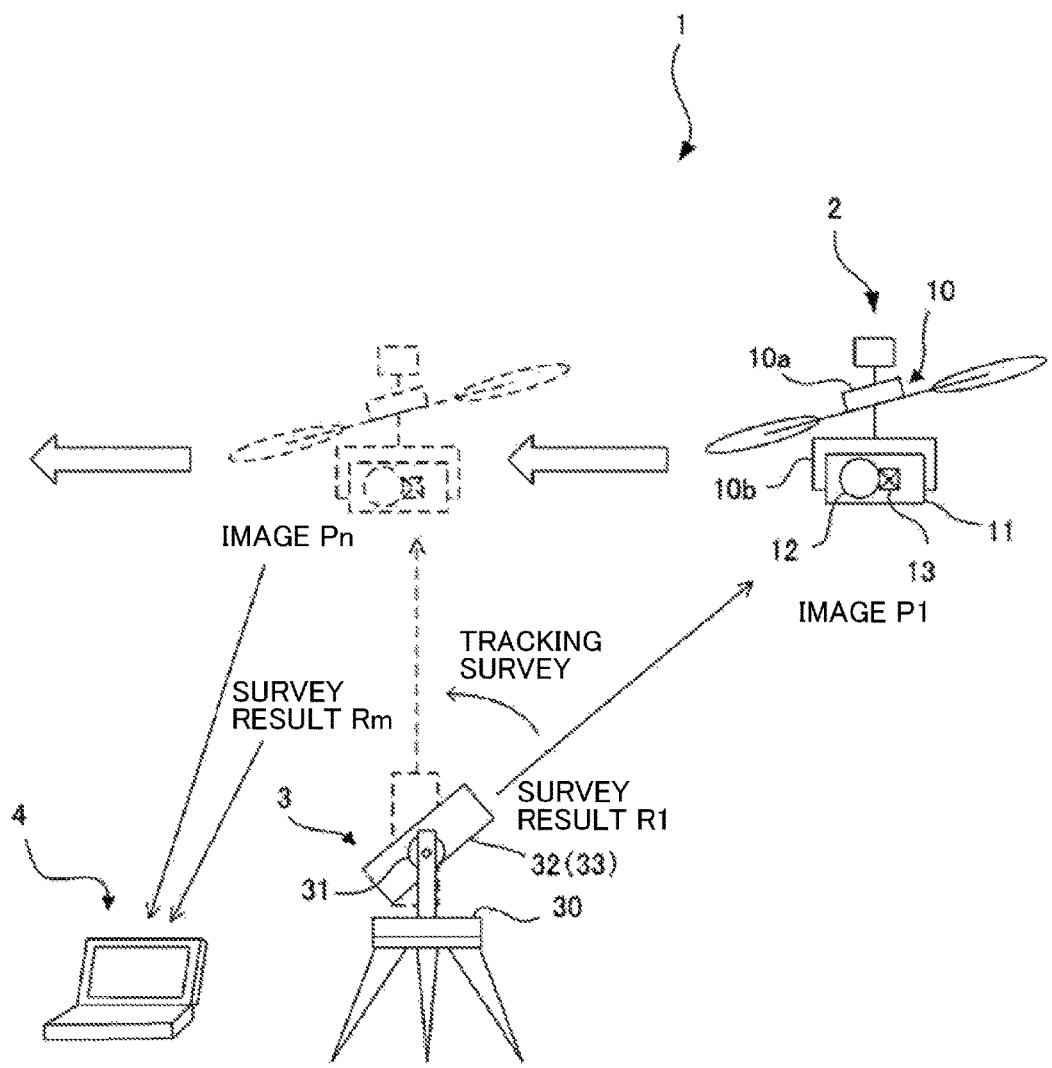
FIG. 1 is an overall configuration diagram of a survey system of one embodiment of the present disclosure.
Figure 2:
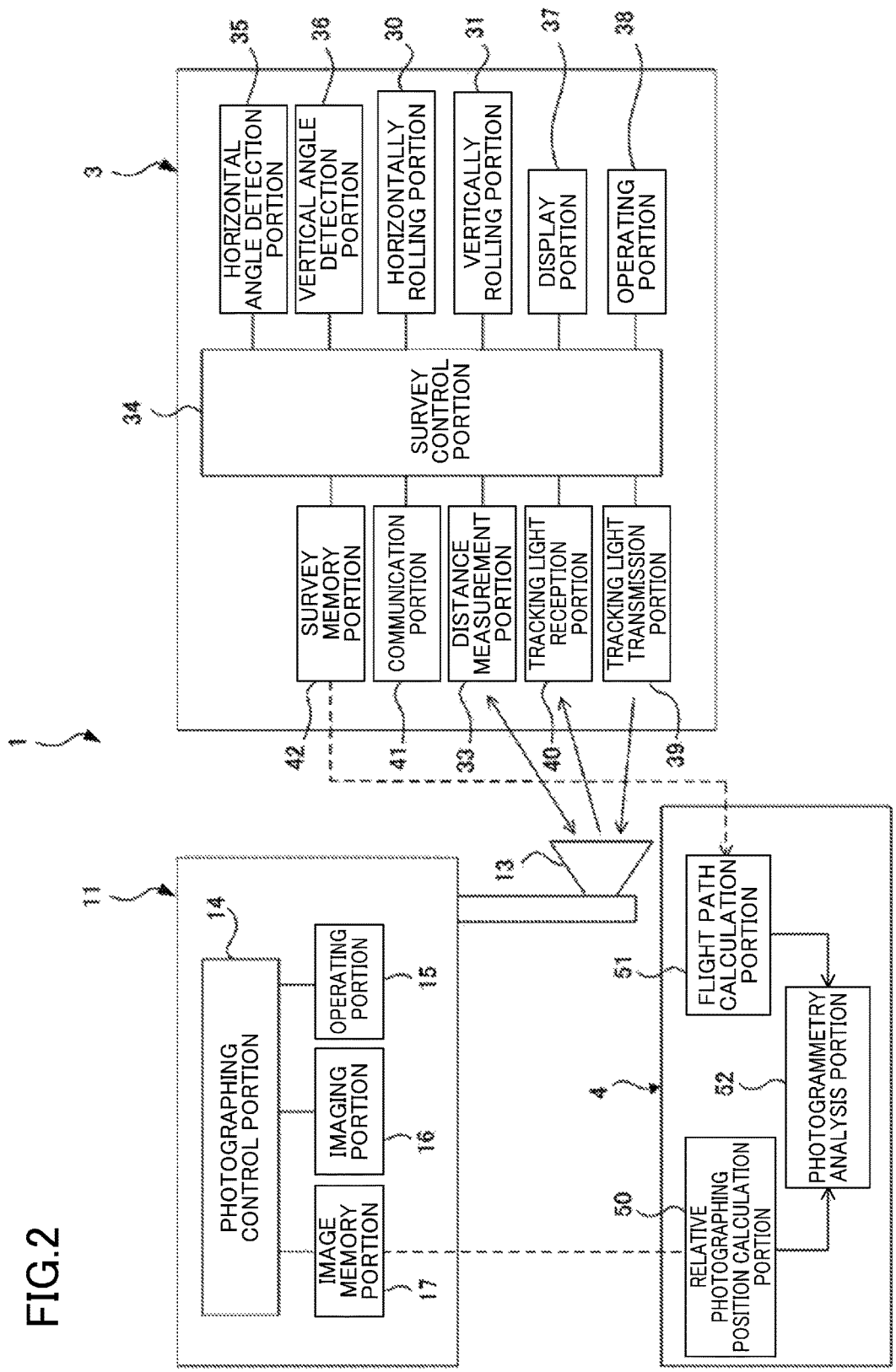
FIG. 2 is a control block diagram of the survey system of one embodiment of the present disclosure.
Figure 3A:
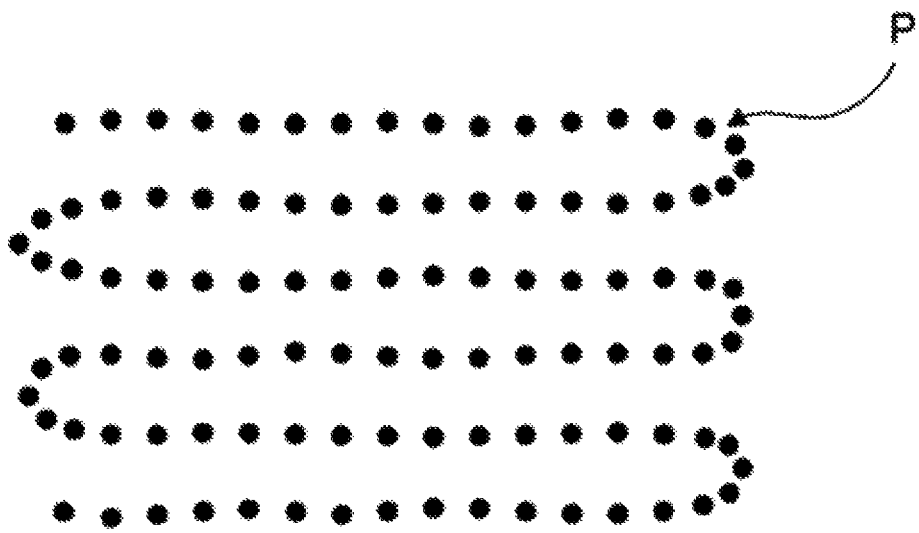
FIG. 3A illustrates one example of a point group of relative photographing positions.
Figure 3B:
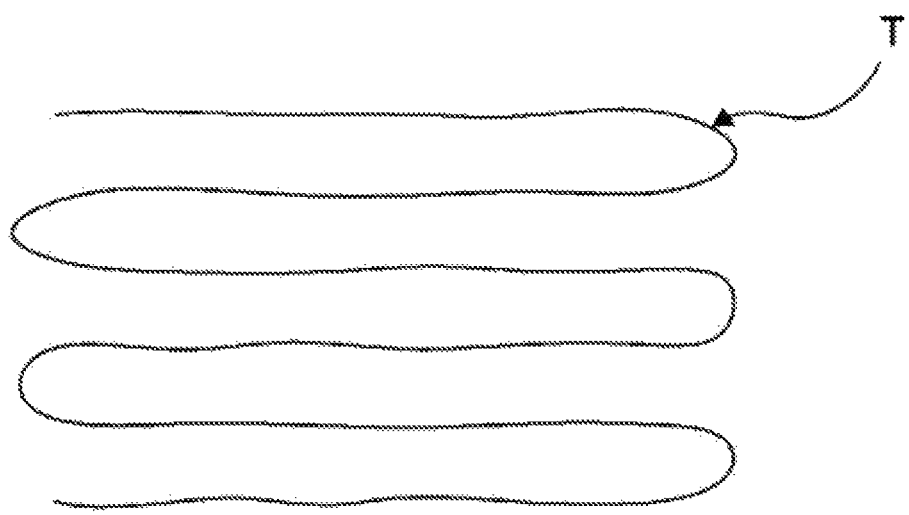
FIG. 3B illustrates one example of a flight path.

FIG. 1 is an overall configuration diagram of a survey system 1 of one embodiment of the present disclosure. FIG. 2 is a control block diagram of the survey system 1. FIG. 3A illustrates one example of a point group of photographing positions. FIG. 3B illustrates one example of a flight path. The overall configuration and control system of the survey system 1 of the embodiment of the present disclosure will be described with reference to FIGS. 1 to 3.

The survey system 1 is a survey system for photogrammetry. The survey system 1 includes a movable shooting device 2 moving to take a plurality of images for photogrammetry, a surveying device 3 determining a position of the movable shooting device 2, and an analysis device 4 analyzing a photographing result and a surveying result, generating data for photogrammetry, and conducting a photogrammetry analysis through the data.

The movable photographing device 2 is composed of a UAV 10, which is a movable body. The UAV 10 includes a camera 11 (a photographing portion) taking images for photogrammetry. Note that the image taken by the camera 11 may be a static image or a dynamic image.

Specifically, the UAV 10 is a flight movable body capable of flying through a predetermined flight path and freely flying by remote control. The UAV 10 includes a flight mechanism 10a for flight and a gimbal mechanism 10b provided below the flight mechanism 10a.

The camera 11 is supported by the gimbal mechanism 10b. The gimbal mechanism 10b enables the camera 11 to take images in any direction, and allows the camera 11 to have a stabilized attitude to take images in a fixed direction.

The camera 11 has a body having a front surface provided with a lens portion 12. The lens portion 12 has a front end beside which a prism 13 is provided.

The surveying device 3 is a total station capable of automatically tracking a survey object. The surveying device 3 includes a horizontally rolling portion 30 capable of rolling in a horizontal direction, a vertically rolling portion 31 capable of rolling in a vertical direction, and a telescope portion 32 provided on the horizontally rolling portion 30 through the vertically rolling portion 31. The telescope portion 32 is also provided with a distance measurement portion 33 such as an electro-optical distance meter (a surveying portion) measuring a slant distance to a target.

Specifically, the surveying device 3 can perform prism survey for surveying the prism 13. That is, the surveying device 3 can measure a distance from the surveying device 3 to the prism 13, and also can measure a horizontal angle and a vertical angle formed by the surveying device 3 and the prism 13. Thus, the surveying device 3 arranged in a predetermined position and having an attitude in a leveled manner can survey the prism 13 to calculate absolute coordinates of the prism 13 from the survey result (the slant distance, the horizontal angle, the vertical angle). As such, the surveying device 3 determines a position of the prism 13 provided beside the front end of the lens portion 12 of the camera 11. During or after the survey, the surveying device 3 corrects the survey result based on the center position of the lens portion 12 and the relative position of and the prism 13 to calculate a survey result of the center position of the lens of the camera 11. In the following descriptions, the survey result refers to this corrected survey result.

The analysis device 4 is an information processing terminal such as a personal computer including software for photogrammetry. Specifically, the analysis device 4 associates the survey result obtained by the surveying device 3 with the photographing position of each image taken by the movable photographing device 2. Then, the analysis device 4 can generate data for photogrammetry to conduct a photogrammetry analysis based on the data to generate a stereo model.

In the survey system 1, as illustrated in FIG. 1, the movable photographing device 2 moves along a predetermined flight path to take a plurality of images P1, P2, ..., Pn for photogrammetry by a predetermined photographing period. The surveying device 3 tracks the camera 11 to conduct a continuous survey. Then, the analysis device 4 associates photographing positions of the images P1, P2, ..., Pn taken by the movable imaging device 2 with the survey results R1, R2, ..., Rm obtained by the surveying device 3 to generate the data for photogrammetry.

Next, referring to FIG. 2, the configuration of the control system based on the camera 11, the surveying device 3, and the computer of the analysis device 4, of the survey system 1, will be described.

As illustrated in FIG. 2, the camera 11 includes a photographing control portion 14. The photographing control portion 14 is electrically connected with an operating portion 15, an imaging portion 16, and an image memory portion 17. Note that, although not shown, the photographing control portion 14 may also be connected with a display portion etc., and may be connected with a sensor etc.

The operating portion 15 is a control means for inputting various operational instructions or settings to the photographing control portion 14. Examples of the operational instructions include instructions for turning on or off a power supply, triggering a photographing operation, switching a photographing mode, setting a photographing period, setting an image quality, and turning on or off a connection with the surveying device 3. The operating portion 15 may also include any operating or input devices such as switches, buttons, and dials.

The imaging portion 16 performs a photographing operation. The imaging portion 16 includes an imaging device (such as a CCD and a CMOS device) converting an optical image into electrical signals, and a shutter.

The image memory portion 17 stores the image data obtained by the camera 11, and can transfer the stored image data to the outside though a storage medium (such as a memory card) or a communication means.

The photographing control portion 14 can control the imaging portion 18 so that the imaging portion 18 performs photographing operations by a predetermined photographing period such as 1 to 3 second(s). Then, the photographing control portion 14 makes the image memory portion 17 store the image data obtained.

The surveying device 3 includes a survey control portion 34. The survey control portion 34 is connected with the horizontally rolling portion 30, the vertically rolling portion 31, and the distance measurement portion 33. The survey control portion 34 is also connected with a horizontal angle detection portion 35 (a surveying portion), a vertical angle detection portion 36 (a surveying portion), a display portion 37, an operating portion 38, a tracking light transmission portion 39, a tracking light reception portion 40, a communication portion 41, and a survey memory portion 42.

The horizontal angle detection portion 35 detects a rolling angle of the horizontally rolling portion 30 in the horizontal direction to detect a horizontal angle collimated by the telescope portion 32. The vertical angle detection portion 36 detects a rolling angle of the vertically rolling portion 31 in the vertical direction to detect a vertical angle collimated by the telescope portion 32. The horizontal angle detection portion 35 and the vertical angle detection portion 36 detect a horizontal angle and a vertical angle, respectively, as survey results.

The display portion 37 is, e.g., a liquid crystal monitor. The display portion 37 can display various pieces of information such as survey results (a slant distance, a horizontal angle, a vertical angle).

The operating portion 38 is a control means for inputting various operational instructions or settings to the survey control portion 34. Examples of the operational instructions include instructions for turning on or off a power supply, triggering a survey, switching a survey mode, and setting a surveying period. Similarly to the operating portion of the camera 11, the operating portion 38 may include any operating or input devices such as switches, buttons, and dials.

The tracking light transmission portion 39 emits tracking light. The tracking light reception portion 40 receives the tracking light reflected by the prism 13. The survey control portion 34 controls the horizontally rolling portion 30 and the vertically rolling portion 31 to enable the tracking light reception portion 40 to keep receiving the tracking light from the tracking light transmission portion 39. As such, the function of tracking a target is achieved.

The communication portion 41 can communicate with exterior equipment. The communication portion 41 is, e.g., a wireless communication means.

The survey memory portion 42 can store a program for the above-described tracking function; various programs for survey (e.g., a program for conducting a survey by a predetermined surveying period); and the survey data, and can transfer the stored survey data to the outside though a storage medium (such as a memory card) or a communication means (such as the communication portion 41).

The survey control portion 34 continuously determines positions of the camera 11 of the movable photographing device 2 by a predetermined surveying period such as 1 to 100 ms when tracking of the prism 13 starts. Then, the survey control portion 34 makes the survey memory portion 43 store the survey data as the survey results.

The analysis device 4 includes a relative photographing position calculation portion 50, a flight path calculation portion 51 (a traveling path calculation portion), and a photogrammetry analysis portion 52.

Specifically, the relative photographing position calculation portion 50 obtains the image data stored in the image memory portion 17 of the camera 11 to conduct a plot analysis of each image to calculate relative photographing positions of the images. In other words, the relative photographing positions are calculated as information about the relative positions of the images where the absolute scales (distances), positions and rotation are not defined. For example, as illustrated in FIG. 3A, the relative photographing positions can be represented as a point group.

The flight path calculation portion 51 obtains the survey data stored in the survey memory portion 42 of the surveying device 3 to calculate the flight path (the traveling path) of the movable photographing device 2 from the survey data. The surveying device 3 tracks and surveys the camera 11 continuously by a short period. Thus, based on the survey result thus obtained, the information about the positions thereof can be represented as a flight path of the movable photographing device 2 as illustrated in FIG. 3B, for example.

The photogrammetry analysis portion 52 associates the point group of the relative photographing positions calculated by the relative photographing position calculation portion 50 with the flight path calculated by the flight path calculation portion 51 to generate the data for photogrammetry. Specifically, the photogrammetry analysis portion 52 adjusts and associates the point group of the relative photographing positions with the flight path to minimize a deviation therebetween to calculate the absolute photographing positions of the images, i.e., the absolute coordinates of the photographing positions. Then, the photogrammetry analysis portion 52 conducts photogrammetry analysis based on this data for photogrammetry to generate a stereo model.

Figure 4:
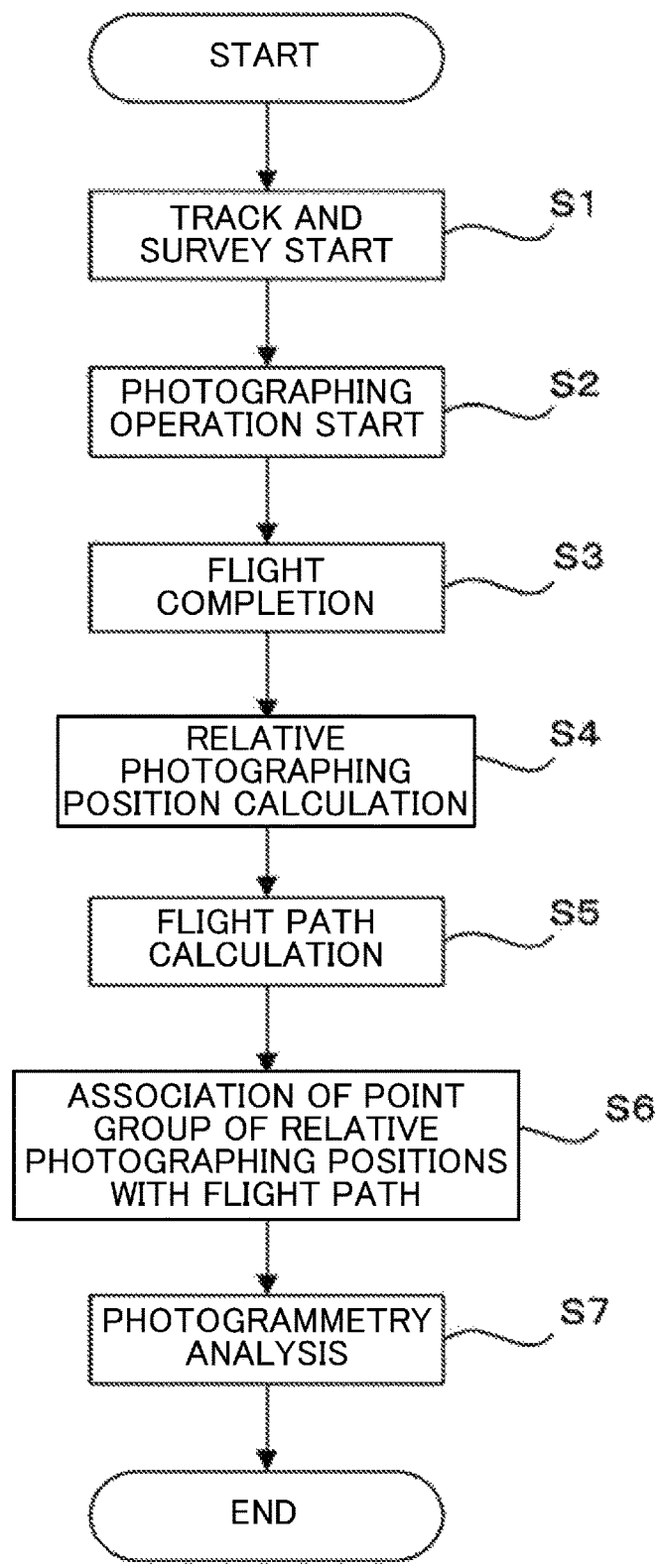
FIG. 4 is a flow chart showing a routine for generating photogrammetry data in the survey system of one embodiment of the present disclosure.
Figure 5:
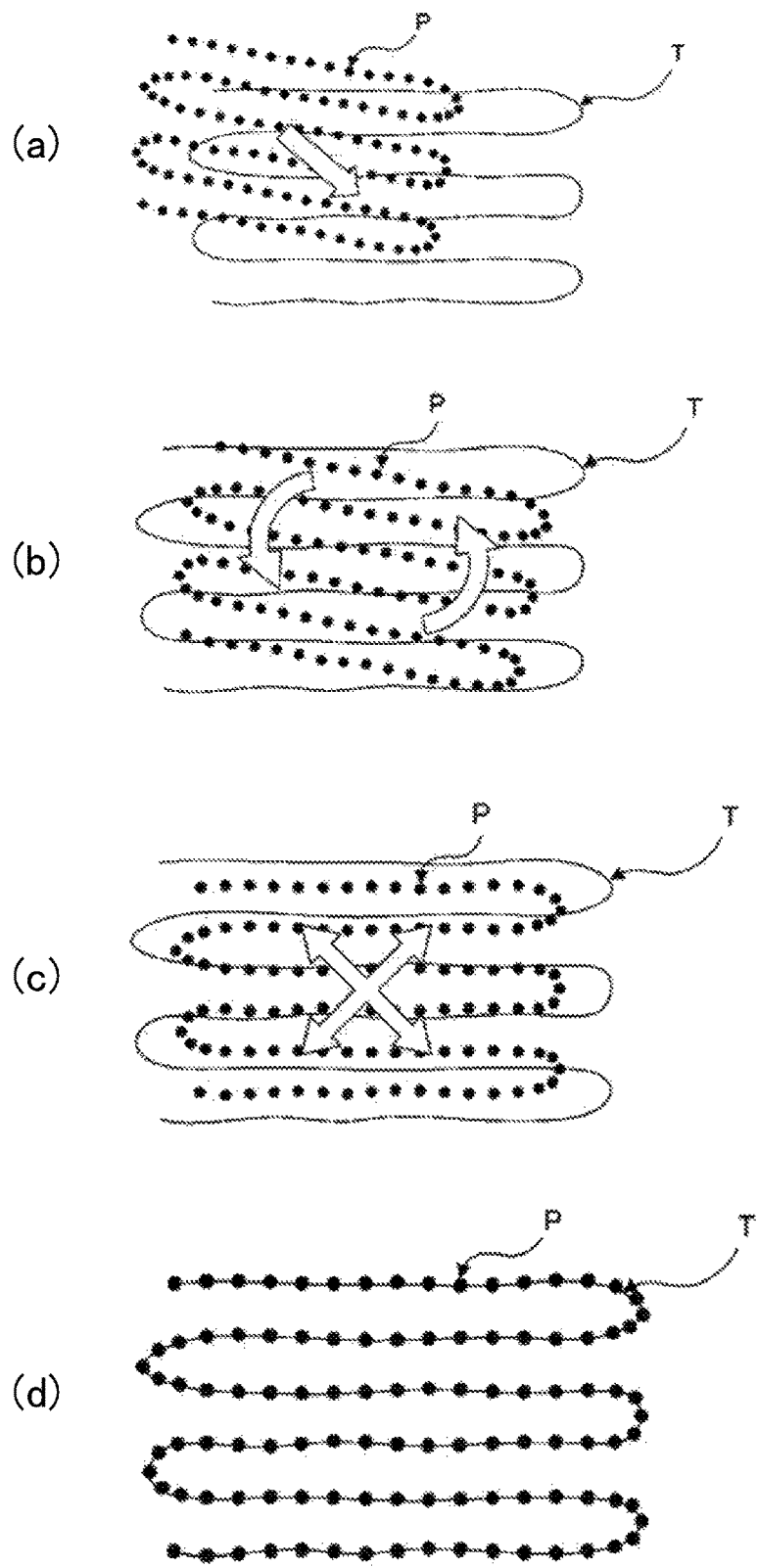
FIG. 5 illustrates one example of a procedure for associating the point group of the relative photographing positions with the flight path.

Here, FIG. 4 is a flow chart showing a photogrammetry routine in the survey system of this embodiment. Stages (a) to (d) of FIG. 5 show one example of a procedure for associating the point group of the relative photographing positions with the flight path. A methodology for generating the data for photogrammetry in the survey system of the embodiment will now be described along the flow chart in FIG. 4, with reference to Stages (a) to (d) of FIG. 5.

First, suppose the following setting to start the photogrammetry routine shown in FIG. 4. The movable photographing device 2 is set to fly along, e.g., the meandering path illustrated in FIG. 3B and conduct photographing operations with the camera 11 by a predetermined photographing period, in the sky above the target areas for photogrammetry. The movable photographing device 2 flies based on this setting.

In Step S1 of the photogrammetry routine, the surveying device 3 starts to track and survey the movable photographing device 2.

Then, in Step S2, the movable photographing device 2 starts to conduct photographing operations through the camera 11.

Then, in Step S3, the movable photographing device 2 completes a flight along the predetermined flight path to finish all the photographing operations. Here, the analysis device 4 receives the image data stored in the image memory portion 17 of the camera 11 and the survey data stored in the survey memory portion 42 of the surveying device 3.

Then, in Step S4, the relative photographing position calculation portion 50 of the analysis device 4 calculates the point group of the relative photographing positions as illustrated in FIG. 3A based on the image data.

Then, in Step S5, the flight path calculation portion 51 of the analysis device 4 calculates the flight path of the movable photographing device 2 as illustrated in FIG. 3B based on the survey data.

Then, in Step S6, the photogrammetry analysis portion 52 associates the point group of the relative photographing positions calculated in Step S4 with the flight path calculated in Step S5.

The procedure for associating the pieces of data will be specifically described below. First, as shown in Stage (a) of FIG. 5, the photogrammetry analysis portion 52 superimposes the point group P of the relative photographing positions upon the flight path T. Then, the photogrammetry analysis portion 52 moves the point group P to match the center positions of the point group P and the flight path T.

As shown in Stage (b) of FIG. 5, after generally having matched the central positions, the photogrammetry analysis portion 52 rotates the point group P to match the orientation of the point group P of the relative photographing positions and the orientation of the flight path T, i.e., to match the directions of extension of the generally straight line portions thereof.

As shown in Stage (c) of FIG. 5, after generally having matched the orientations of the point group P and the flight path T, the photogrammetry analysis portion 52 enlarges the point group P to put the point group P of the relative photographing positions on the flight path T. Note that the point group P is downsized if the point group P is larger than the flight path T.

As shown in Stage (d) of FIG. 5, after having finely adjusted (i.e., moved, rotated, and enlarged or downsized) the point group P, the photogrammetry analysis portion 52 finally generally matches the point group P of the relative photographing positions with the flight path T. Note that Stages (a) to (d) of FIG. 5 show only the two-dimensional adjustments for the sake of illustration. In practice, three-dimensional adjustments are required. Stages (a) to (d) of FIG. 5 also show conceptual diagrams for the brief descriptions. Each adjustment herein is merely one example. Other typical adjustments (or matching) are applicable. The adjusting operations and fine adjustments automatically conducted by the photogrammetry analysis portion 52 in Stages (a) to (d) of FIG. 5 may be manually conducted by an operator.

As such, the photogrammetry analysis portion 52 adjusts the point group P of the relative photographing positions to the flight path T to minimize the deviation therebetween to associate the survey result matching each relative photographing position with the absolute coordinates of the relative photographing position. Note that all the points of the relative photographing positions might not always match the flight path. If there is no survey result matching the relative photographing position in the flight path, a survey result closest to the relative photographing position is assigned as the relative photographing position. As such, the survey result obtained by the surveying device 3 is set to the photographing position of each image, so that the image on which the absolute coordinates are stamped is used as the data for photogrammetry.

Then, in Step S7 of FIG. 4, the photogrammetry analysis is conducted based on the data for photogrammetry generated in Step S6 to generate a stereo model where the absolute scales (distances), positions, and rotation are defined. Then, the routine is ended.

As described above, the survey system 1 of this embodiment calculates the point group P of the relative photographing positions from the images taken by the camera 11 of the movable photographing device 2, and calculates the flight path T from the survey result obtained by the surveying device 3. Then, the survey system 1 associates this point group P with the flight path T to obtain the absolute photographing positions.

In other words, it is unnecessary to use a GPS as in a typical manner to obtain photographing positions. Thus, it is possible to conduct a photogrammetry operation in, e.g., a building or a tunnel where a GPS signal cannot be received. It is also possible to obtain the information about the photographing positions based on the survey result obtained by the surveying device 3 such as a total station that is more accurate than a GPS. In addition, it is unnecessary to frame control points in the image. Thus, the photograph operation is not limited, and it is unnecessary to take effort to set control points.

This enables association of the relative photographing positions taken by the camera 11 of the movable photographing device 2 with the survey result obtained by the surveying device 3 tracking and surveying the movable photographing device 2 to conduct the accurate photogrammetry analysis.

In particular, as shown in Stages (a) to (d) of FIG. 5, the system moves, rotates, and enlarges or downsizes the point group P to adjust the point group P to the flight path T to minimize the deviation therebetween. Thus, the point group P is easily associated with the flight path T.

Suppose that there is no survey result matching the relative photographing position. In this case, a survey result closest to the relative photographing position may be assigned as the absolute coordinates of the relative photographing position. Thus, even if there is a deviation between the relative photographing position and the flight path T, easy association can be achieved, and the accurate photogrammetry analysis can be maintained.

The description of the embodiment of the present disclosure is now ended, but the aspect of the present disclosure is not limited to this embodiment.

In the embodiment described above, the movable photographing device 2 flies along the meandering flight path. The moving path of the movable body is not limited to this path. In particular, a distinctive flight path may be formed to more accurately associate the point group of the relative photographing positions with the flight path.

Figure 6A:
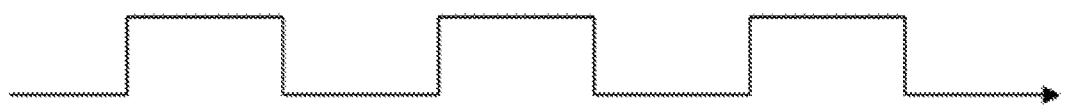
FIG. 6A illustrates a first variation of the flight path.
Figure 6B:
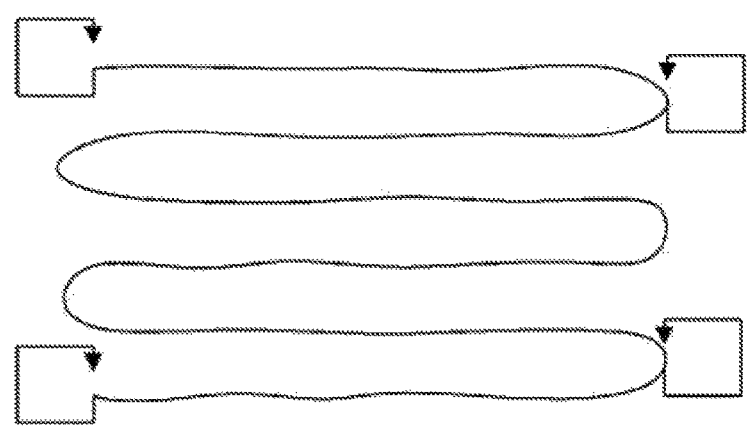
FIG. 6B illustrates a second variation of the flight path.

For example, FIG. 6A illustrates a first variation of the flight path. FIG. 6B illustrates a second variation of the flight path.

In the first variation of FIG. 6A, the flight path is repeatedly bent in a cranked manner. Such a flight path has the bent portion distinct from a straight flight path so that a clear association can be made. The flight path of the first variation is advantageous particularly in an elongated flight range.

In the second variation of FIG. 6B, the meandering flight path as in the embodiment described above has four corners in plan view, each corner having a rectangular flight path. This rectangular flight path portion is distinct so that a clear association can be made. Note that the flight path of each of the four corners is not limited to the rectangular shape, and may be circular, for example.

In the embodiment and variations described above, the movable photographing device 2 is composed of the UAV 10 as a movable body. However, the movable body is not limited thereto. For example, the movable body may be a manned flying body such as a helicopter or an airplane; or a movable body moving on the ground, such as a vehicle or a human. The data for photogrammetry may be generated from association of the traveling path of the movable body with the point group of the photographing positions.

In addition, in the embodiment described above, the relative photographing position calculation portion 50 and the flight path calculation portion 51 are provided on the analysis device 4. For example, the relative photographing position calculation portion may be provided in the movable photographing device, and the flight path calculation portion may be provided in the surveying device. In addition, the surveying device may have all the functions of the analysis device.

What is claimed is:

1. A survey system comprising:
   a photographing portion provided in a movable body and taking a plurality of images for photogrammetry;
   a surveying portion tracking the photographing portion and continuously determining a position of the photographing portion;
   a relative photographing position calculation portion calculating a relative photographing position of each image based on the plurality of images taken by the photographing portion;
   a traveling path calculation portion calculating a traveling path of the movable body from a survey result obtained by the surveying portion; and
   a photogrammetry analysis portion
      associating
         a point group of the relative photographing positions calculated by the relative photographing position calculation portion with
         the traveling path calculated by the traveling path calculation portion and
      generating data for photogrammetry.

2. The survey system of claim 1, wherein
the photogrammetry analysis portion adjusts and associates the point group of the relative photographing positions with the flight path to minimize a deviation between the point group of the relative photographing positions and the flight path to conduct the association.

3. The survey system of claim 1, wherein
if there is no survey result matching the relative photographing position in the flight path, the photogrammetry analysis portion assigns a survey result closest to the relative photographing position as the relative photographing position.

* * * * *